(12) United States Patent
Tai et al.

(10) Patent No.: US 8,791,678 B2
(45) Date of Patent: Jul. 29, 2014

(54) OFFSET AND DELAY CANCELLATION CIRCUIT FOR A SWITCHING DC-DC POWER SUPPLY

(75) Inventors: Ting-Jung Tai, Hsinchu (TW); Chih-Hao Yang, Tainan (TW); An-Tung Chen, Pingjen (TW)

(73) Assignee: Richtek Technology Corp., Hsinchu (TW)

( * ) Notice: Subject to any disclaimer, the term of this patent is extended or adjusted under 35 U.S.C. 154(b) by 104 days.

(21) Appl. No.: 13/188,867

(22) Filed: Jul. 22, 2011

(65) Prior Publication Data

US 2012/0025793 A1    Feb. 2, 2012

(30) Foreign Application Priority Data

Jul. 29, 2010 (TW) .................... 99125122 A

(51) Int. Cl.
*H02M 3/156* (2006.01)
(52) U.S. Cl.
USPC .......................................... 323/283; 323/284
(58) Field of Classification Search
USPC .................... 323/282–284, 351, 223, 225
See application file for complete search history.

(56) References Cited

U.S. PATENT DOCUMENTS

| | | | |
|---|---|---|---|
| 6,570,368 B2* | 5/2003 | Demizu | 323/282 |
| 6,791,306 B2* | 9/2004 | Walters et al. | 323/288 |
| 6,922,042 B2* | 7/2005 | Umemoto et al. | 323/283 |
| 7,274,174 B2* | 9/2007 | Wang et al. | 323/224 |
| 7,327,129 B2* | 2/2008 | Chen et al. | 323/285 |
| 7,382,114 B2* | 6/2008 | Groom | 323/271 |
| 7,388,358 B2* | 6/2008 | Duan | 323/282 |
| 7,446,520 B2* | 11/2008 | Hung | 323/288 |
| 7,592,790 B2* | 9/2009 | Yang | 323/277 |
| 7,728,749 B2* | 6/2010 | Sahu | 341/144 |
| 8,004,263 B2* | 8/2011 | Hirata et al. | 323/285 |
| 8,334,682 B2* | 12/2012 | Chiu et al. | 323/282 |
| 8,350,548 B2* | 1/2013 | Tang et al. | 323/282 |
| 2007/0222423 A1* | 9/2007 | Chen et al. | 323/283 |
| 2008/0130186 A1* | 6/2008 | Nagase et al. | 361/154 |
| 2009/0058387 A1* | 3/2009 | Huynh et al. | 323/282 |
| 2010/0019749 A1* | 1/2010 | Katsuya et al. | 323/282 |
| 2011/0260703 A1* | 10/2011 | Laur et al. | 323/271 |
| 2012/0081085 A1* | 4/2012 | Miyamae | 323/271 |
| 2012/0217941 A1* | 8/2012 | Chen et al. | 323/271 |
| 2013/0009621 A1* | 1/2013 | Chen | 323/282 |

\* cited by examiner

*Primary Examiner* — Gary L Laxton
*Assistant Examiner* — Kyle J Moody
(74) *Attorney, Agent, or Firm* — Muncy, Geissler, Olds & Lowe, P.C.

(57) ABSTRACT

A control circuit of a switching DC-DC power supply includes a feedback circuit detecting an output voltage of the power supply to generate a feedback signal, an error comparator detecting an error between the output voltage and a design value of the output voltage, a control logic circuit generating a control signal according to the error for regulating the output voltage, and an offset and delay cancellation circuit generating an offset adjust signal according to the feedback signal and a second reference voltage for adjusting an offset of the error comparator to pull the output voltage toward the design value.

30 Claims, 7 Drawing Sheets

OFFSET AND DELAY CANCELLATION CIRCUIT FOR A SWITCHING DC-DC POWER SUPPLY

FIELD OF THE INVENTION

The present invention is related generally to a switching DC-DC power supply and, more particularly, to a control circuit and method of a switching DC-DC power supply.

BACKGROUND OF THE INVENTION

As shown in FIG. 1, a constant on time switching DC-DC power supply employs a control circuit 10 to provide a control signal Sd to control an output stage 11 to generate a regulated output voltage Vout. The output stage 11 includes a pair of power switches M1 and M2 connected in series, an inductor L and a capacitor C in the manner that the inductor L is connected between the switching node between the power switches M1 and M2 and the capacitor C. In the control circuit 10, a feedback circuit 16 detects the output voltage Vout to generate a feedback signal Vfb, an error comparator 14 compares the feedback signal Vfb with a reference voltage Vref to generate a comparison signal EC, and a control logic circuit 12 triggers the on time of the control signal Sd according to the comparison signal EC. The control logic circuit 12 includes a flip-flop 20 to trigger a signal Vc in response to the comparison signal EC, an on time one shot circuit 18 to trigger a signal Sr according to the signal Vc to reset the flip-flop 20, and a driver 22 to generate the control signal Sd in response to the signal Vc. In the control logic circuit 12, the on time one shot circuit 18 and the flip-flop 20 establish a constant on time trigger for generating the signal Vc that has a constant pulse width for the on time of the control signal Sd. For constant off time switching DC-DC power supply, the constant on time trigger is replaced by a constant off time trigger for generating a constant pulse width for the off time of the control signal for the output stage.

FIG. 2 is a waveform diagram of the switching DC-DC power supply shown in FIG. 1. Referring to FIGS. 1 and 2, when the feedback signal Vfb goes down beyond the reference voltage Vref, as shown at time t1, the comparison signal EC turns to high from low, thereby triggering the signal Vc to turn on the high side power switch M1 to charge the inductor L, and the output voltage Vout acquires energy through the filter composed of the inductor L and the capacitor C. After triggered by the signal Vc, the signal Sr lasts for a constant pulse width time and then terminates to reset the flip-flop 20 to turn off the signal Vc, as shown at time t2, thereby turning on the low side power switch M2 to release the energy of the inductor L. This energy release continues until the feedback signal Vfb goes down beyond the reference voltage Vref again, and then the process enters the next cycle. This is a complete cycle of a constant on time control system.

As compared with the other pulse width modulation (PWM) control circuits, the constant on time control circuit 10 uses the error comparator 14 instead of an error amplifier, thereby advantageously having simpler circuit, requiring no compensation circuit and allowing fast response. Yet, its defect is that the real output voltage Vout may depart from the design value of the output voltage. As shown in FIG. 3, the real output voltage Vout has the waveform 24 and the average Vout(dc) 26 that departs from its design value Vout(set) 28 due to the combined influence of the output ripple Vripple, the offset Voff of the error comparator 14 itself, the response delay Td and the output voltage, output inductance and capacitance of the applied circuit. To solve this problem, conventionally, the offset Voff of the error comparator 14 is adjusted, for example, by adding or subtracting a fixed value to or from the offset Voff of the error comparator 14. However, the output ripple Vripple, the offset Voff and the response delay Td usually vary with the input voltage, output voltage, output inductance, output capacitance, and the slew rate of the input terminal of the applied circuit, causing it difficult to provide adjustment adaptable to all conditions.

Therefore, it is desired a control circuit and method to dynamically adjust the offset of an error comparator of a switching DC-DC power supply depending on real application environments.

SUMMARY OF THE INVENTION

An objective of the present invention is to provide a switching DC-DC power supply.

Another objective of the present invention is to provide a control circuit and method of a switching DC-DC power supply.

A further objective of the present invention is to provide an offset and delay cancellation circuit for dynamically adjusting the offset of an error comparator of a switching DC-DC power supply.

According to the present invention, a control circuit of a switching DC-DC power supply includes a feedback circuit to detect the output voltage of the power supply to generate a feedback signal, an error comparator to compare the feedback signal with a first reference voltage to generate a comparison signal to trigger a control signal for the power supply to regulate the output voltage, and an offset and delay cancellation circuit to generate an offset adjust signal according to the feedback signal and a second reference voltage for adjusting the offset of the error comparator.

According to the present invention, a control method of a switching DC-DC power supply detects the output voltage of the power supply to generate a feedback signal, compares the feedback signal with a first reference voltage by an error comparator to generate a comparison signal for generating a control signal for the power supply to regulate the output voltage, generates an offset adjust signal according to the feedback signal and a second reference voltage, and adjusts the offset of the error comparator according to the offset adjust signal.

According to the present invention, a switching DC-DC power supply includes an output stage to provide an output voltage, a feedback circuit to detect the output voltage to generate a feedback signal, an error comparator to compare the feedback signal with a first reference voltage to generate a comparison signal to generate a control signal to control the output stage, and an offset and delay cancellation circuit to determine an offset adjust signal according to the feedback signal and a second reference voltage for adjusting the offset of the error comparator.

The offset adjust signal is adjusted according to the feedback signal and the second reference voltage, and thus dynamically adjusts the offset of the error comparator depending on the real conditions, thereby pulling the average of the real output voltage toward the design value thereof. Preferably, the offset adjust signal is stored according to the offset calibration signal at appropriate time points to provide appropriate offset adjust signal.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
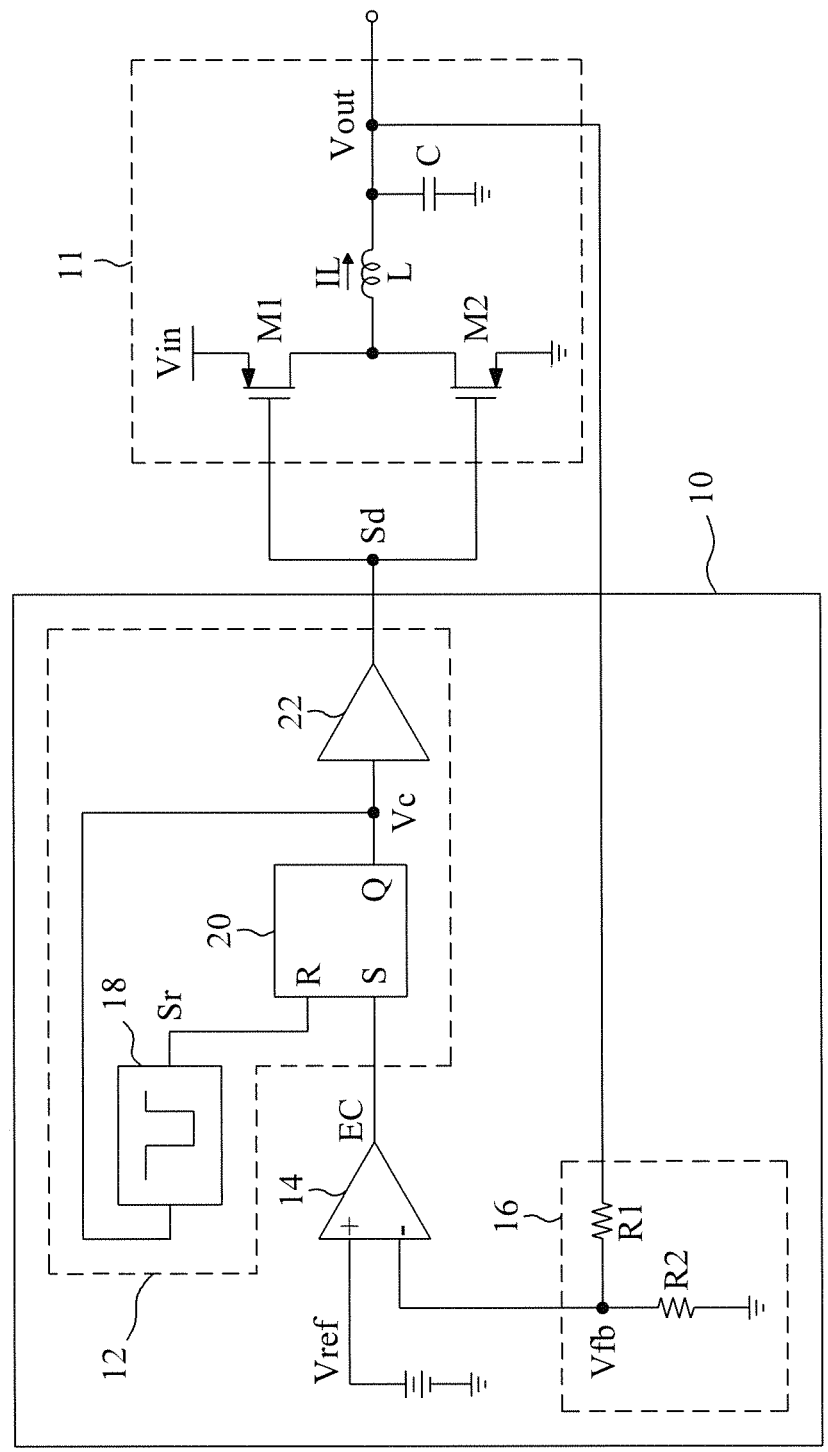
FIG. 1 is a circuit diagram of a conventional constant on time switching DC-DC power supply.
Figure 2:
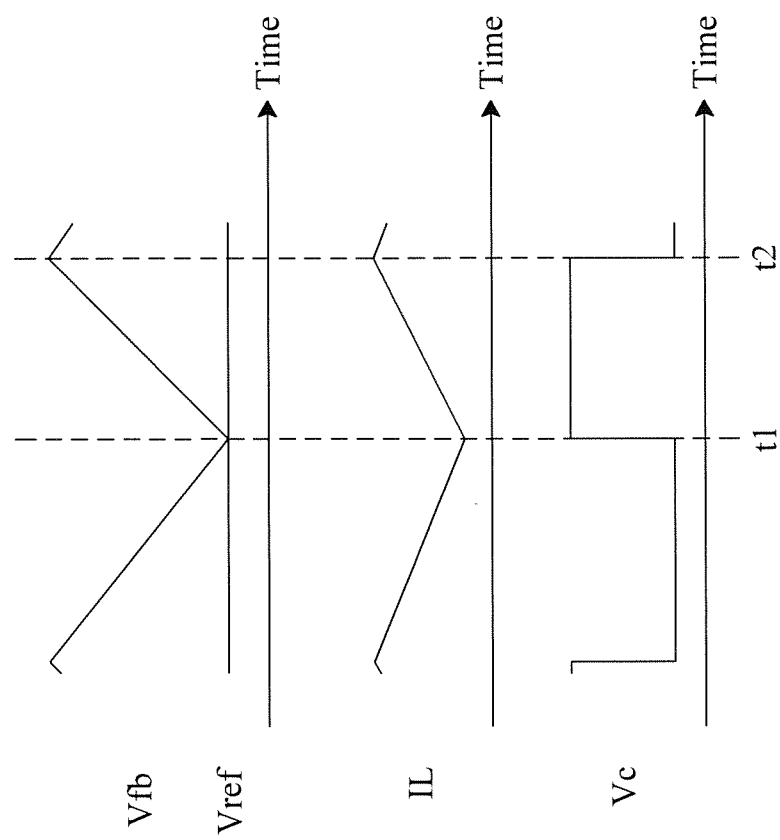
FIG. 2 is a waveform diagram of the switching DC-DC power supply shown in FIG. 1.
Figure 3:
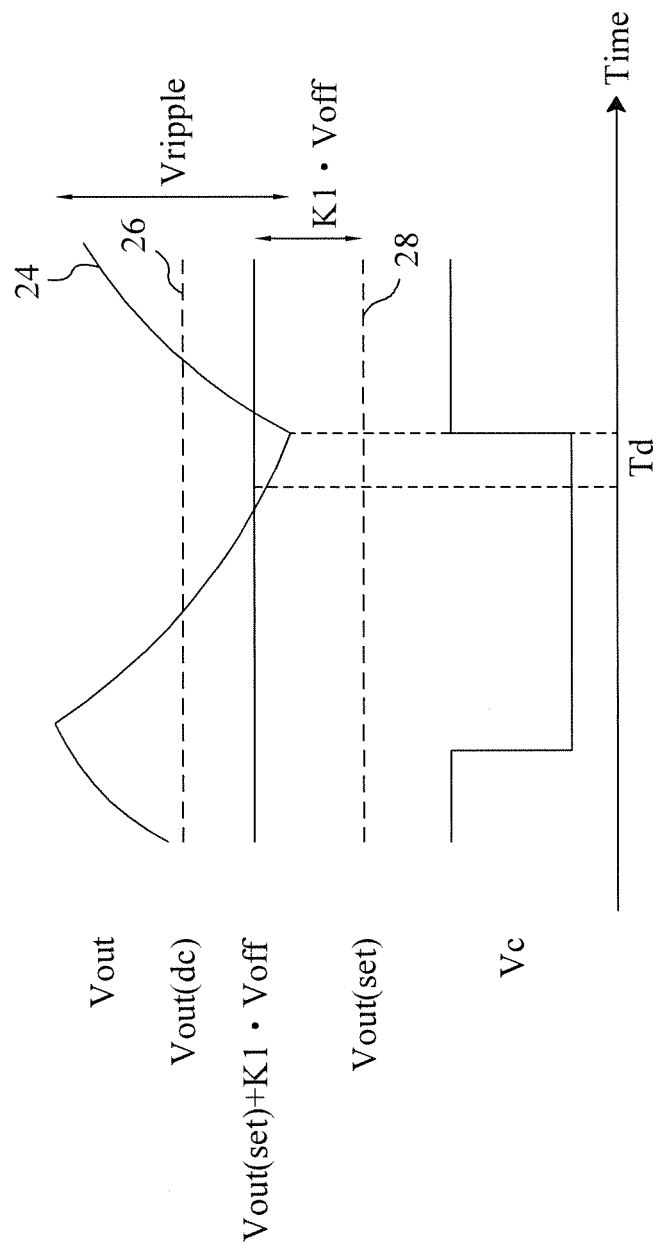
FIG. 3 is a waveform diagram showing the real output voltage of the switching DC-DC power supply shown in FIG. 1 departing from its design value.
Figure 4:
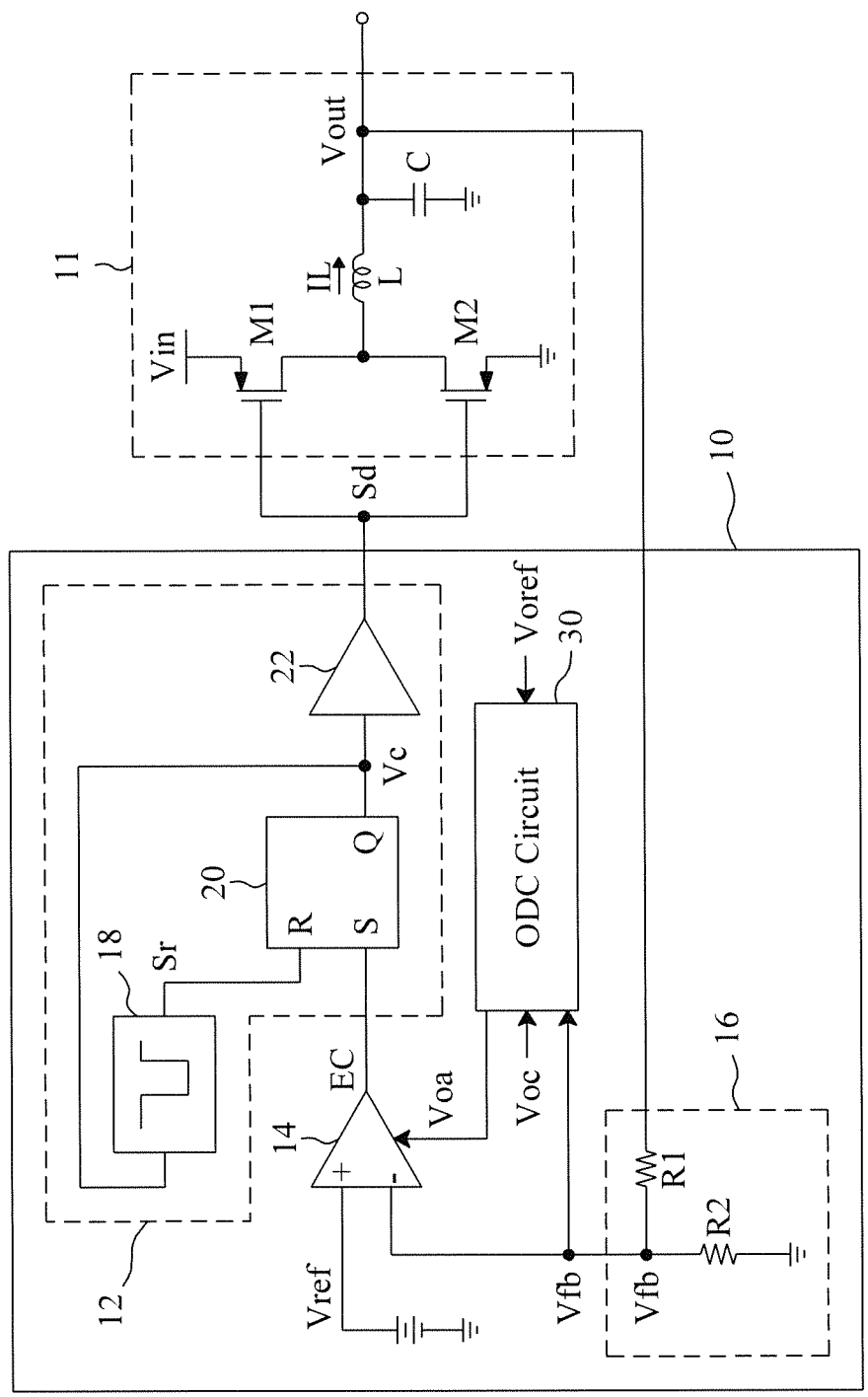
FIG. 4 is a circuit diagram of an embodiment according to the present invention.

FIG. 4 is a circuit diagram of an embodiment according to the present invention designed on the basis of the circuit shown in FIG. 1, in which an offset and delay cancellation (ODC) circuit 30 generates an offset adjust signal Voa according to the feedback signal Vfb and a reference voltage Voref to dynamically adjust the offset of the error comparator 14, thereby pulling the average of the output voltage Vout toward its design value. In addition, as is well known, when the power supply enters its sleep mode, the level of the output voltage Vout will depart from its design value because the power switches M1 and M2 are both kept off. In this case, if the ODC circuit 30 still dynamically adjusts the offset of the error comparator 14, the offset of the error comparator 14 will be adjusted upward or downward excessively. Consequently, when the power supply returns to its normal operation from the sleep mode, the error comparator 14 will generate incorrect output voltage Vout due to the excessive adjustment of the offset of the error comparator 14. For preventing this, an offset calibration signal Voc is set to control the ODC circuit 30, thereby make it to calibrate and store an offset adjust signal Voa at appropriate time points.

Figure 5:
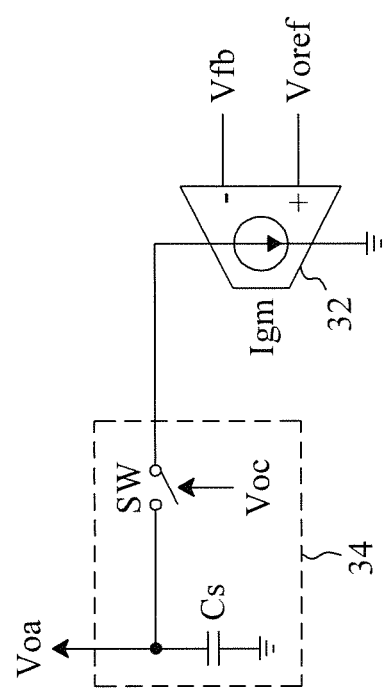
FIG. 5 is a circuit diagram of a first embodiment for the offset and delay cancellation circuit shown in FIG. 4.

FIG. 5 is a circuit diagram of a first embodiment for the ODC circuit 30 shown in FIG. 4, which includes an error transconductor 32 and a sample-and-hold circuit 34. The error transconductor 32 generates an error current Igm that may be positive or negative according to the difference between the feedback signal Vfb and the reference voltage Voref. The sample-and-hold circuit 34 samples and holds the error current Igm according to the offset calibration signal Voc to generate the offset adjust signal Voa. The sample-and-hold circuit 34 includes a capacitor Cs and a switch SW connected between the capacitor Cs and the error transconductor 32. When the offset calibration signal Voc turns on the switch SW, the voltage Voa of the capacitor Cs varies with the error current Igm. When the offset calibration signal Voc turns off the switch SW, the capacitor Cs transfers the offset adjust signal Voa it stores to the error comparator 14 for adjusting the offset of the error comparator 14, thereby making the feedback signal Vfb close to the reference voltage Voref. The reference voltage Voref represents the design value of the output voltage Vout, and thus the ODC circuit 30 is capable of pulling the average of the real output voltage Vout toward the design value.

Figure 6:
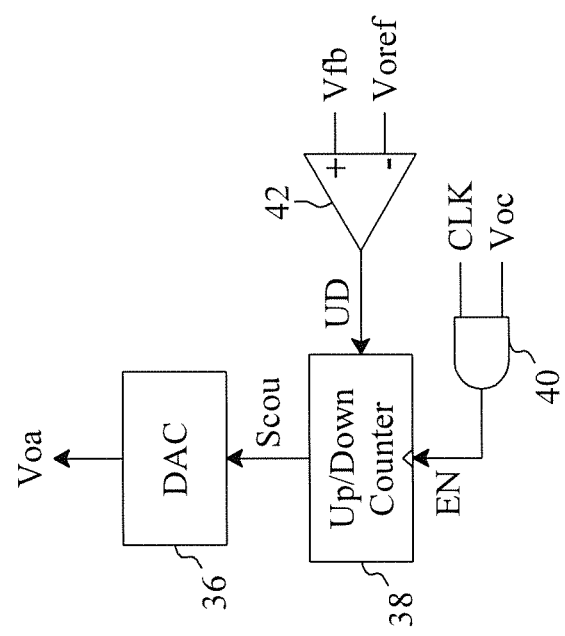
FIG. 6 is a circuit diagram of a second embodiment for the offset and delay cancellation circuit shown in FIG. 4.

FIG. 6 is a circuit diagram of a second embodiment for the ODC circuit 30 shown in FIG. 4, which includes a digital-to-analog converter (DAC) 36, an up/down counter 38, an AND gate 40 and a comparator 42. The comparator 42 compares the feedback signal Vfb with the reference voltage Voref to generate a comparison signal UD for the up/down counter 38, and the AND gate 40 generates an enable signal EN according to a clock CLK and the offset calibration signal Voc to enable the up/down counter 38. The clock CLK may be an oscillation signal generated inside the power supply. After enabled, the up/down counter 38 determines a count value Scou according to the comparison signal UD. It also stores the count value Scou and transmits the same to the DAC 36 where the count value Scou is converted into the offset adjust signal Voa for the error comparator 14 to adjust its offset, thereby making the feedback signal Vfb close to the reference voltage Voref. The reference voltage Voref represents the design value of the output voltage Vout, and thus the ODC circuit 30 is capable of pulling the average of the real output voltage Vout toward the design value.

Figure 7:
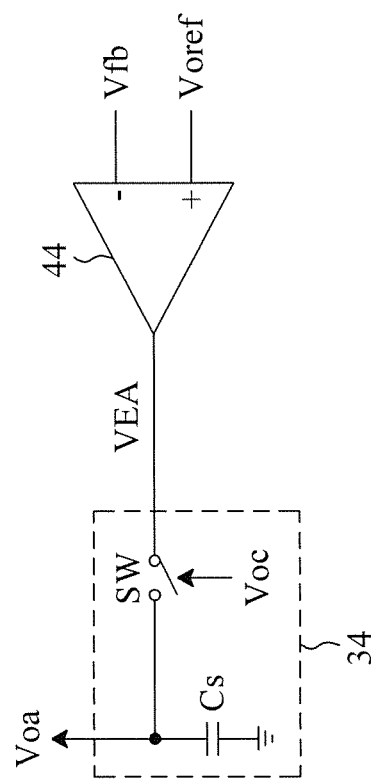
FIG. 7 is a circuit diagram of a third embodiment for the offset and delay cancellation circuit shown in FIG. 4.

FIG. 7 is a circuit diagram of a third embodiment for the ODC circuit 30 shown in FIG. 4, which is similar to the circuit of FIG. 5, but with an error amplifier 44 replacing the error transconductor 32. The error amplifier 44 amplifies the difference between the feedback signal Vfb and the reference voltage Voref to generate an error voltage VEA, and the sample-and-hold circuit 34 samples and holds the error voltage VEA according to the offset calibration signal Voc to generate the offset adjust signal Voa.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit of a switching DC-DC power supply having an output terminal for providing an output voltage, the control circuit comprising:
   a feedback circuit connected to the output terminal, detecting the output voltage to generate a feedback signal;
   an error comparator connected to the feedback circuit, comparing the feedback signal with a first reference voltage to generate a comparison signal;
   a control logic circuit connected to the error comparator, generating a control signal according to the comparison signal for the power supply to regulate the output voltage; and
   an offset and delay cancellation circuit connected to the feedback circuit and the error comparator, generating an offset adjust signal according to the feedback signal and a second reference voltage for adjusting an offset of the error comparator;
   wherein the offset and delay cancellation circuit comprises:
   an error transconductor connected to the feedback circuit, generating an error current according to a difference between the feedback signal and the second reference voltage; and
   a sample-and-hold circuit connected to the error transconductor and the error comparator, sampling and holding the error current to generate the offset adjust signal.

2. The control circuit of claim 1, wherein the sample-and-hold circuit samples and holds the error current in response to an offset calibration signal.

3. The control circuit of claim 1, wherein the control logic circuit comprises a constant time trigger.

4. The control circuit of claim 3, wherein the constant time trigger comprises a constant on time trigger or a constant off time trigger.

5. A control circuit of a switching DC-DC power supply having an output terminal for providing an output voltage, the control circuit comprising:
- a feedback circuit connected to the output terminal, detecting the output voltage to generate a feedback signal,
- an error comparator connected to the feedback circuit, comparing the feedback signal with a first reference voltage to generate a comparison signal;
- a control logic circuit connected to the error comparator, generating a control signal according to the comparison signal for the power supply to regulate the output voltage; and
- an offset and delay cancellation circuit connected to the feedback circuit and the error comparator, generating an offset adjust signal according to the feedback signal and a second reference voltage for adjusting an offset of the error comparator;
- wherein the offset and delay cancellation circuit comprises:
  - an error amplifier connected to the feedback circuit, generating an error voltage according to a difference between the feedback signal and the second reference voltage; and
  - a sample-and-hold circuit connected to the error amplifier and the error comparator, sampling and holding the error voltage to generate the offset adjust signal.

6. The control circuit of claim 5, wherein the sample-and-hold circuit samples and holds the error voltage in response to an offset calibration signal.

7. The control circuit of claim 5, wherein the control logic circuit comprises a constant time trigger.

8. The control circuit of claim 7, wherein the constant time trigger comprises a constant on time trigger or a constant off time trigger.

9. A control circuit of a switching DC-DC power supply having an output terminal for providing an output voltage, the control circuit comprising:
- a feedback circuit connected to the output terminal, detecting the output voltage to generate a feedback signal;
- an error comparator connected to the feedback circuit, comparing the feedback signal with a first reference voltage to generate a comparison signal;
- a control logic circuit connected to the error comparator, generating a control signal according to the comparison signal for the power supply to regulate the output voltage; and
- an offset and delay cancellation circuit connected to the feedback circuit and the error comparator, generating an offset adjust signal according to the feedback signal and a second reference voltage for adjusting an offset of the error comparator;
- wherein the offset and delay cancellation circuit comprises:
  - a comparator connected to the feedback circuit, comparing the feedback signal with the second reference voltage to generate a second comparison signal;
  - an up/down counter connected to the comparator, determining a count value according to the second comparison signal and storing the count value; and
  - a digital-to-analog converter connected to the up/down counter, converting the count value into the offset adjust signal.

10. The control circuit of claim 9, further comprising an AND gate connected to the up/down counter, generating an enable signal according to a clock and an offset calibration signal for enabling the up/down counter.

11. The control circuit of claim 9, wherein the control logic circuit comprises a constant time trigger.

12. The control circuit of claim 11, wherein the constant time trigger comprises a constant on time trigger or a constant off time trigger.

13. A control method of a switching DC-DC power supply having an output terminal for providing an output voltage, the control method comprising the steps of:
- (A) detecting the output voltage to generate a feedback signal;
- (B) comparing the feedback signal with a first reference voltage by an error comparator to generate a comparison signal for triggering an on time of a control signal for the power supply to regulate the output voltage;
- (C) generating an offset adjust signal according to the feedback signal and a second reference voltage; and
- (D) adjusting an offset of the error comparator according to the offset adjust signal;
- wherein the step C comprises the steps of:
  - generating an error current according to a difference between the feedback signal and the second reference voltage; and
  - sampling and holding the error current in response to an offset calibration signal to generate the offset adjust signal.

14. The control method of claim 13, further comprising the step of storing the offset adjust signal in response to an offset calibration signal.

15. A control method of a switching DC-DC power supply having an output terminal for providing an output voltage, the control method comprising the steps of:
- (A) detecting the output voltage to generate a feedback signal;
- (B) comparing the feedback signal with a first reference voltage by an error comparator to generate a comparison signal for triggering an on time of a control signal for the power supply to regulate the output voltage;
- (C) generating an offset adjust signal according to the feedback signal and a second reference voltage; and
- (D) adjusting an offset of the error comparator according to the offset adjust signal;
- wherein the step C comprises the steps of:
  - amplifying a difference between the feedback signal and the second reference voltage to generate an error voltage; and
  - sampling and holding the error voltage in response to an offset calibration signal to generate the offset adjust signal.

16. The control method of claim 15, further comprising the step of storing the offset adjust signal in response to an offset calibration signal.

17. A control method of a switching DC-DC power supply having an output terminal for providing an output voltage, the control method comprising the steps of:
- (A) detecting the output voltage to generate a feedback signal;
- (B) comparing the feedback signal with a first reference voltage by an error comparator to generate a comparison signal for triggering an on time of a control signal for the power supply to regulate the output voltage;
- (C) generating an offset adjust signal according to the feedback signal and a second reference voltage; and
- (D) adjusting an offset of the error comparator according to the offset adjust signal;
- wherein the step C comprises the steps of:

comparing the feedback signal with the second reference voltage to generate a second comparison signal;
determining a count value according to the second comparison signal;
storing the count value; and
converting the count value into the offset adjust signal.

18. The control method of claim 17, further comprising the step of storing the offset adjust signal in response to an offset calibration signal.

19. A switching DC-DC power supply comprising:
an output stage operative to provide an output voltage;
a feedback circuit connected to the output stage, detecting the output voltage to generate a feedback signal;
an error comparator connected to the feedback circuit, comparing the feedback signal with a first reference voltage to generate a comparison signal;
a control logic circuit connected to the error comparator and the output stage, generating a control signal according to the comparison signal to control the output stage for regulating the output voltage; and
an offset and delay cancellation circuit connected to the feedback circuit and the error comparator, generating an offset adjust signal according to the feedback signal and a second reference voltage for adjusting an offset of the error comparator;
wherein the offset and delay cancellation circuit comprises:
an error transconductor connected to the feedback circuit, generating an error current according to a difference between the feedback signal and the second reference voltage; and
a sample-and-hold circuit connected to the error transconductor and the error comparator, sampling and holding the error current to generate the offset adjust signal.

20. The switching DC-DC power supply of claim 19, wherein the sample-and-hold circuit samples and holds the error current in response to an offset calibration signal.

21. The switching DC-DC power supply of claim 19, wherein the control logic circuit comprises a constant time trigger.

22. The switching DC-DC power supply of claim 21, wherein the constant time trigger comprises a constant on time trigger or a constant off time trigger.

23. A switching DC-DC power supply comprising:
an output stage operative to provide an output voltage;
a feedback circuit connected to the output stage, detecting the output voltage to generate a feedback signal;
an error comparator connected to the feedback circuit, comparing the feedback signal with a first reference voltage to generate a comparison signal;
a control logic circuit connected to the error comparator and the output stage, generating a control signal according to the comparison signal to control the output stage for regulating the output voltage; and
an offset and delay cancellation circuit connected to the feedback circuit and the error comparator, generating an offset adjust signal according to the feedback signal and a second reference voltage for adjusting an offset of the error comparator;
wherein the offset and delay cancellation circuit comprises:
an error amplifier connected to the feedback circuit, generating an error voltage according to a difference between the feedback signal and the second reference voltage; and
a sample-and-hold circuit connected to the error amplifier and the error comparator, sampling and holding the error voltage to generate the offset adjust signal.

24. The switching DC-DC power supply of claim 23, wherein the sample-and-hold circuit samples and holds the error voltage in response to an offset calibration signal.

25. The switching DC-DC power supply of claim 23, wherein the control logic circuit comprises a constant time trigger.

26. The switching DC-DC power supply of claim 25, wherein the constant time trigger comprises a constant on time trigger or a constant off time trigger.

27. A switching DC-DC power supply comprising:
an output stage operative to provide an output voltage;
a feedback circuit connected to the output stage, detecting the output voltage to generate a feedback signal;
an error comparator connected to the feedback circuit, comparing the feedback signal with a first reference voltage to generate a comparison signal;
a control logic circuit connected to the error comparator and the output stage, generating a control signal according to the comparison signal to control the output stage for regulating the output voltage; and
an offset and delay cancellation circuit connected to the feedback circuit and the error comparator, generating an offset adjust signal according to the feedback signal and a second reference voltage for adjusting an offset of the error comparator;
wherein the offset and delay cancellation circuit comprises:
a comparator connected to the feedback circuit, comparing the feedback signal with the second reference voltage to generate a second comparison signal;
an up/down counter connected to the comparator, determining a count value according to the second comparison signal and storing the count value; and
a digital-to-analog converter connected to the up/down counter, converting the count value into the offset adjust signal.

28. The switching DC-DC power supply of claim 27, further comprising an AND gate connected to the up/down counter, generating an enable signal according to a clock and an offset calibration signal for enabling the up/down counter.

29. The switching DC-DC power supply of claim 27, wherein the control logic circuit comprises a constant time trigger.

30. The switching DC-DC power supply of claim 29, wherein the constant time trigger comprises a constant on time trigger or a constant off time trigger.

* * * * *